United States Patent
Jeong

(10) Patent No.: US 11,481,064 B2
(45) Date of Patent: Oct. 25, 2022

(54) DISPLAY DEVICE INCLUDING A TOUCH SENSOR HAVING LINES OF A NON-UNIFORM WIDTH

(71) Applicant: Samsung Display Co., Ltd., Yongin-Si (KR)

(72) Inventor: Hwan Hee Jeong, Yongin-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/424,399

(22) Filed: May 28, 2019

(65) Prior Publication Data
US 2020/0159383 A1    May 21, 2020

(30) Foreign Application Priority Data
Nov. 21, 2018   (KR) ......................... 10-2018-0144859

(51) Int. Cl.
  *G06F 3/041*    (2006.01)
  *G06F 3/044*    (2006.01)
(52) U.S. Cl.
  CPC ........ *G06F 3/04164* (2019.05); *G06F 3/0446* (2019.05)
(58) Field of Classification Search
  CPC ....... G06F 3/04164; G06F 3/041–0412; G06F 3/0416; G06F 3/044–0446; G02F 1/13338; H01L 27/323
  See application file for complete search history.

(56) References Cited

U.S. PATENT DOCUMENTS

| | | | |
|---|---|---|---|
| 9,501,187 B2 | 11/2016 | Kim | |
| 9,983,711 B2 | 5/2018 | Lee et al. | |
| 2013/0106747 A1* | 5/2013 | Choi | G06F 3/041 345/173 |
| 2014/0299357 A1* | 10/2014 | Nakamura | G06F 3/047 174/250 |
| 2015/0205424 A1* | 7/2015 | Park | G06F 3/04164 345/174 |
| 2016/0070394 A1* | 3/2016 | Van Ostrand | G06F 3/047 345/173 |
| 2016/0147346 A1* | 5/2016 | Lee | G06F 3/0412 345/173 |
| 2016/0147375 A1 | 5/2016 | Bok et al. | |

(Continued)

FOREIGN PATENT DOCUMENTS

| KR | 10-1448094 B1 | 10/2014 |
|---|---|---|
| KR | 10-2016-0063485 A | 6/2016 |

(Continued)

*Primary Examiner* — Temesghen Ghebretinsae
*Assistant Examiner* — Ivelisse Martinez Quiles
(74) *Attorney, Agent, or Firm* — Innovation Counsel LLP

(57) ABSTRACT

A display device includes: a display panel including a first substrate and a second substrate which are partitioned into a display region and a non-display region formed outside the display region; and a touch sensor including a plurality of touch electrodes overlapping the display region and formed on the second substrate, a plurality of pads overlapping the non-display region and formed on the second substrate, and a plurality of touch lines connecting the plurality of pads and the plurality of touch electrodes, wherein at least some of the touch lines includes a region having a first width and a region having a second width wider than the first width.

16 Claims, 7 Drawing Sheets

(56) References Cited

U.S. PATENT DOCUMENTS

| | | | |
|---|---|---|---|
| 2016/0202833 A1* | 7/2016 | Kim | G06F 3/04164 |
| | | | 345/173 |
| 2016/0291723 A1* | 10/2016 | Kurasawa | H05K 1/117 |
| 2016/0299597 A1* | 10/2016 | Yoo | G06F 3/0445 |
| 2016/0334910 A1* | 11/2016 | Ono | G06F 3/0412 |
| 2017/0024060 A1* | 1/2017 | Seong | G06F 3/0445 |
| 2017/0083137 A1* | 3/2017 | Kurasawa | G02F 1/133 |
| 2017/0288009 A1* | 10/2017 | Kim | H01L 51/52 |
| 2018/0157362 A1 | 6/2018 | Kim et al. | |
| 2018/0182822 A1* | 6/2018 | Seo | H01L 27/323 |
| 2019/0008041 A1* | 1/2019 | Nakamura | G06F 3/0446 |
| 2019/0018524 A1* | 1/2019 | Shiojiri | G06F 3/047 |
| 2020/0159350 A1* | 5/2020 | Yang | G06F 3/0448 |

FOREIGN PATENT DOCUMENTS

| | | |
|---|---|---|
| KR | 10-2016-0063540 A | 6/2016 |
| KR | 10-2016-0073533 A | 6/2016 |

* cited by examiner

DISPLAY DEVICE INCLUDING A TOUCH SENSOR HAVING LINES OF A NON-UNIFORM WIDTH

This application claims priority to and the benefit of Korean Patent Application No. 10-2018-0144859 filed in the Korean Intellectual Property Office on Nov. 21, 2018, the disclosure of which is incorporated herein by reference in its entirety.

BACKGROUND

1. Field

The present disclosure relates to a display device with a touch sensor.

2. Description of the Related Art

A touch sensor is an input device that can input a user's command by selecting contents displayed on a screen of a display device using a human hand or an object such as a pen or a stylus. Typically, a touch sensor converts a contact position of a touch input into an electrical signal to trigger an instruction associated with the contact position as an input signal of the display device. Accordingly, a display device having a touch sensor can be operated without a separate input apparatus such as a keyboard and a mouse.

The touch sensor may include a touch electrode unit where a plurality of touch electrodes are disposed, a pad unit, and a line unit that includes touch lines and connects the touch electrodes to the pad unit. The touch sensor may be embedded in a display device, as being formed on the display device, or separately manufactured and attached to the display device.

Recently, as a display region of a display device that displays an image is maximized, efforts have been made to reduce or minimize a non-display region outside the display region that is referred to as a dead space. To reduce the non-display region, widths of touch lines and a gap between adjacent touch lines of the touch sensor that are disposed therein are reduced. As a result, a resistance of the touch lines may increase, and a short may occur between adjacent touch lines.

SUMMARY

An exemplary embodiment of the present disclosure provides a display device including a touch sensor with improved touch performance by reducing a resistance of touch lines.

A display device according to an exemplary embodiment of the present disclosure includes a display panel including a first substrate and a second substrate that are partitioned into a display region and a non-display region that is disposed outside the display region; and a touch sensor including a plurality of touch electrodes overlapping the display region and formed on the second substrate, a plurality of pads overlapping the non-display region and formed on the second substrate, and a plurality of touch lines connecting the plurality of pads and the plurality of touch electrodes, wherein at least some of the plurality of touch lines include a first region having a first width and a second region having a second width that is wider than the first width.

In an exemplary embodiment of the present disclosure, the second region of the at least some of the plurality of touch lines having the second width may be closer to an edge of the non-display region than the first region of the at least some of the plurality of touch lines having the first width.

In an exemplary embodiment of the present disclosure, the non-display region may include a first non-display region having a first length measured from a first edge of the display region to a first edge of the non-display region; and a second non-display region having a second length measured from a second edge of the display region to a second edge of the non-display region, wherein the second length is longer than the first length.

In an exemplary embodiment of the present disclosure, the second region of the at least some of the plurality of touch lines having the second width may be disposed in the second non-display region.

In an exemplary embodiment of the present disclosure, a gap between the plurality of touch lines adjacent to each other may be non-uniform.

In an exemplary embodiment of the present disclosure, adjacent ones of the at least some of the plurality of touch lines are spaced by a first gap in the first region, and the adjacent ones of the at least some of the plurality of touch lines are spaced by a second gap in the second region.

In an exemplary embodiment of the present disclosure, the second gap may be wider than the first gap.

In an exemplary embodiment of the present disclosure, the display device may further include a polarizer disposed on the touch sensor, and the polarizer may entirely overlap display regions and overlap at least a portion of the non-display region.

In an exemplary embodiment of the present disclosure, the second region of the at least some of the plurality of touch lines having the second width may entirely overlap the polarizer.

In an exemplary embodiment of the present disclosure, an edge of the polarizer may overlap at least a portion of a sealant, and the second substrate may be interposed between the polarizer and the sealant.

In an exemplary embodiment of the present disclosure, the edge of the polarizer may include a first edge overlapping the portion of the sealant and a second edge not overlapping the sealant, and the second edge may be disposed closer to the display region than the first edge.

In an exemplary embodiment of the present disclosure, the second region of the at least some of the plurality of touch lines having the second width may be disposed between the display region and the first edge of the polarizer.

In an exemplary embodiment of the present disclosure, the plurality of pads may be disposed between the second edge of the polarizer and an edge of the second substrate.

In an exemplary embodiment of the present disclosure, the touch sensor is a double routing type.

In an exemplary embodiment of the present disclosure, the plurality of touch electrodes may include a plurality of touch electrode rows extended in a first direction and a plurality of touch electrode columns extended in a second direction crossing the first direction, and each of the plurality of the touch electrode rows and/or the touch electrode columns may be connected to at least two touch lines of the plurality of touch lines.

According to an exemplary embodiment of the present disclosure, some of the plurality of touch lines have a widened width, thereby reducing a resistance of the touch lines and improving a touch performance of the touch sensor.

In addition, by protecting the touch lines by using the polarizer, a display device can be more resistant to moisture and foreign matters.

DETAILED DESCRIPTION OF THE EMBODIMENTS

Figure 1:
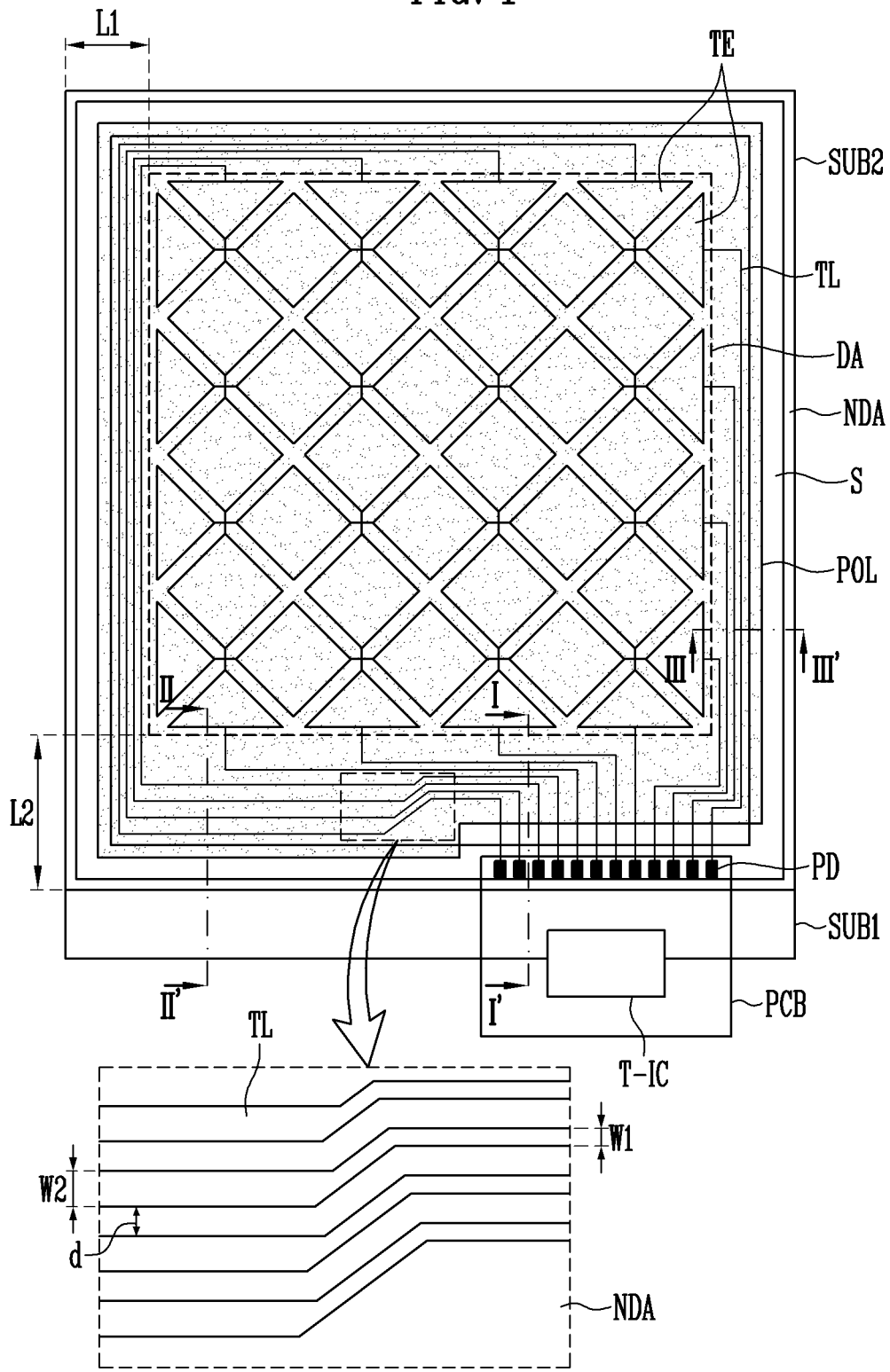
FIG. 1 is a plan view of a display device according to an exemplary embodiment of the present disclosure.

Like reference numerals in the drawings denote like elements. In addition, in the drawings, thicknesses, ratios and dimensions of elements may be exaggerated for clarity of illustration. The term 'and/or' means that one or more or any combination of relevant constituent elements is possible.

The terms, 'first,' 'second,' and the like may be simply used for description of various elements, but meanings of those terms may not be limited to the restricted meanings. The above terms are used only for distinguishing one element from other elements. For example, a first element may be referred to as a second element and similarly, the second element may be referred to as the first element within the scope of the present disclosure. When explaining a singular term, unless explicitly described to the contrary, it may also be interpreted as a plural term. For example, a pixel including a pixel electrode (singular) may encompass an embodiment in which the pixel includes only pixel electrode as well as another embodiment in which the pixel includes two or more pixel electrodes.

In addition, terms such as "under," "below," "on," "above," and the like are used to describe the relationship of two more elements shown in the drawings. These terms are expressed in a relative manner and may be made on the basis of the orientation and/or direction shown in the drawings. The term "comprise" or "has" is used to specify existence of a feature, a number, a process, an operation, an element, a part, or a combination thereof, and it will be understood that existence or additional possibility of one or more other features, numbers, processes, operations, elements, parts, or combinations thereof are not excluded.

Hereinafter, exemplary embodiments of the present disclosure will be described in further detail with reference to the accompanying drawings.

Figure 2:
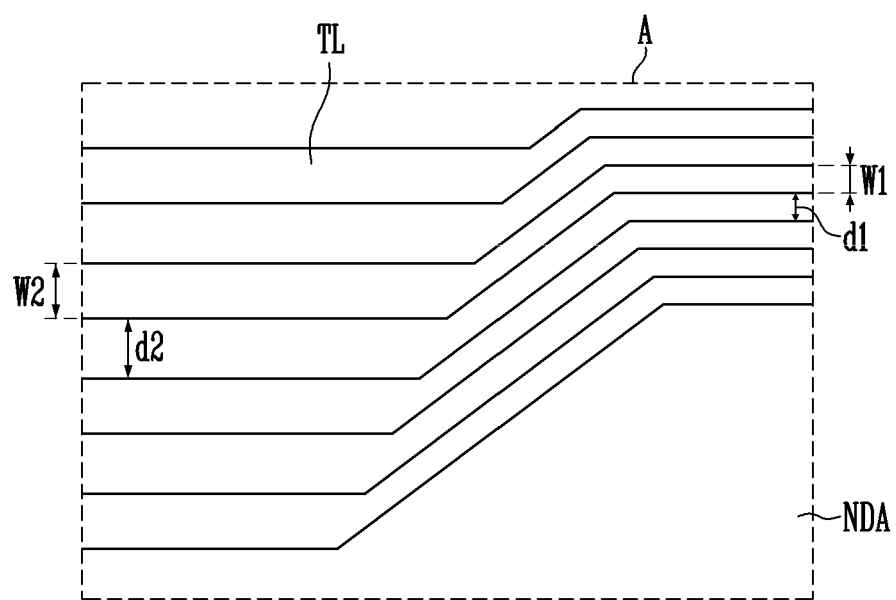
FIG. 2 illustrates an exemplary embodiment of a touch line of the display device shown in FIG. 1 according to another embodiment.

FIG. 1 is a plan view of a display device according to an exemplary embodiment of the present disclosure, and FIG. 2 illustrates an exemplary embodiment of a touch line of the display device shown in FIG. 1 according to another embodiment.

Figure 3A:
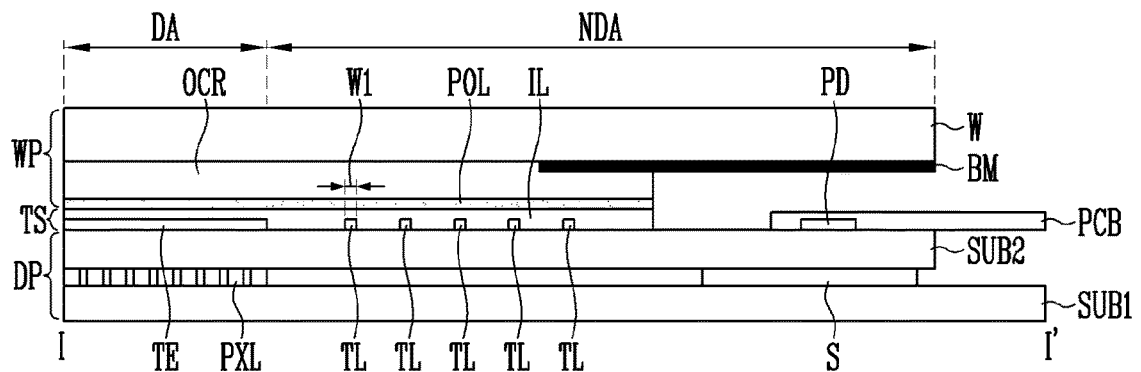
FIG. 3A is a cross-sectional view taken along a line I-I' of FIG. 1.
Figure 3B:
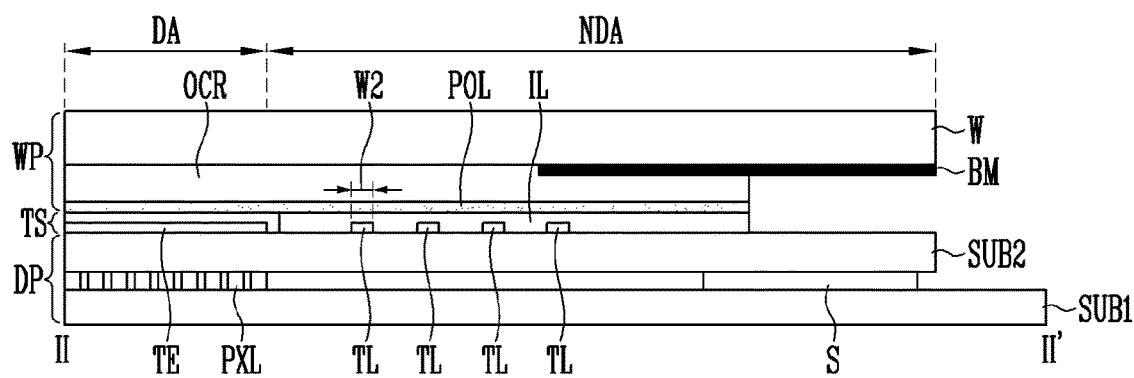
FIG. 3B is a cross-sectional view taken along a line II-II' of FIG. 1.
Figure 3C:
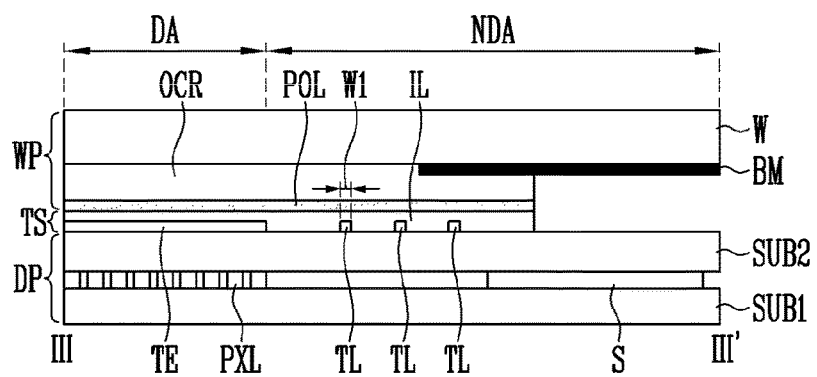
FIG. 3C is a cross-sectional view taken along a line III-III' of FIG. 1.

FIG. 3A is a cross-sectional view taken along a line I-I' of FIG. 1, FIG. 3B is a cross-sectional view taken along a line II-II' of FIG. 1, and FIG. 3C is a cross-sectional view taken along a line III-III' of FIG. 1.

As shown in FIGS. 1, 2, 3A, 3B and 3C, a display device includes a display panel DP, a touch sensor TS disposed on the display panel DP, and a window panel WP disposed on the touch sensor TS. The display panel DP includes a first substrate SUB1 and a second substrate SUB2 facing each other. The touch sensor TS includes a plurality of touch electrodes TE, a plurality of pads PD, and a plurality of touch lines TL connecting the touch electrodes TE and the pads PD. The window panel WP includes a polarizer POL. Some of the touch lines TL include a first region having a first width W1 and a second region having a second width W2 that is wider than the first width W1.

It is understood that the display panel DP may not be particularly limited to a particular type of display panel. For example, a self-luminous display panel such as an organic light emitting display (OLED) panel may be used as the display panel DP. In addition, a non-self-luminous display panel such as a liquid crystal display (LCD) panel, an electrophoretic display (EPD) panel, and an electro-wetting display (EWD) panel may be used as the display panel DP. When the non-self-luminous display panel is used as the display panel DP, the display device may further include a light source (e.g., a backlight) for supplying light to the display panel DP.

The display panel DP may include a display region DA and a non-display region NDA other than the display region DA.

The display region DA may display an image using a plurality of pixels PXL disposed therein, and the non-display region NDA may be disposed around the display region DA and may include a driver (not shown) for driving the plurality of pixels PXL. The plurality of pixels PXL and the driver (not shown) may be connected to each other through driving lines (not shown) for transmitting driving signals. In FIG. 1, the display region DA is formed in a quadrangular shape, and the non-display region NDA is formed to enclose an outer periphery of the quadrangular display region DA. However, it is understood that shapes of the display region DA and the non-display region NDA are not limited thereto, and various other shapes of the display region DA and the non-display region NDA such as circular, elliptical, oval shapes are possible without deviating from the scope of the present disclosure.

The non-display region NDA may include a first region (e.g., the top and side regions) having the first length L1 measured from an edge of the display region DA to an edge of the non-display region NDA along a first direction and a second region (e.g., the bottom region) having the second length L2 measured from an edge of the display region DA to an edge of the non-display region NDA along a second direction perpendicular to the first direction. The second length L2 may be shorter than the first length L1. The pads PD may be disposed in the non-display region NDA having the second length L2.

The first substrate SUB1 and the second substrate SUB2 may be a rigid substrate or a flexible substrate. Examples of the rigid substrate include, but are not limited to, a glass substrate, a quartz substrate, a glass ceramic substrate, and a crystalline glass substrate. Examples of the flexible substrate include, but are not limited to, a film substrate and a plastic substrate including a polymeric organic material. The flexible substrate may include at least one or more of polyethersulfone(PES), polyacrylate, polyetherimide(PEI), polyethylene naphthalate(PEN), polyethylene terephthalate (PET), polyphenylene sulfide(PPS), polyarylate(PAR), polyimide(PI), polycarbonate(PC), triacetate cellulose (TAC), and cellulose acetate propionate(CAP). In addition, the flexible substrate may include glass fiber reinforced plastic(FRP).

The pixels PXL may be disposed on the first substrate SUB1 to correspond to the display region DA. Each pixel of the pixels PXL is the smallest unit that displays an image.

According to one embodiment, the second substrate SUB2 may be an encapsulation substrate of the display panel DP, and may be formed in a shape substantially similar to the first substrate SUB1. For example, in a case where the first substrate SUB1 has a quadrangular shape, the second substrate SUB2 may also have a quadrangular. However, the shapes of the first and second substrates SUB1 and SUB2 are not limited thereto, and various other shapes of the first and second substrates SUB1 and SUB2 such as circular, elliptical, oval shapes are possible without deviating from the scope of the present disclosure.

According to one embodiment, the touch sensor TS may be directly formed on the second substrate SUB2, and the second substrate SUB2 may serve as a base substrate of the touch sensor TS. In this case, a thickness of the display device may be reduced because no additional substrate to dispose the touch sensor TL is necessary, and the manufacturing cost may be reduced because less material is used, and an extra process of attaching the separate substrate to the second substrate SUB2 is unnecessary. In some embodiments, the touch sensor TS may be disposed on a separate substrate including the touch electrodes TE and the touch lines TL, and the separate substrate may be attached on the display panel DP.

The first substrate SUB1 and the second substrate SUB2 may be bonded together by using a sealant S that is formed in the non-display region NDA. The sealant S may be formed along the non-display region NDA outside the display region DA of the first substrate SUB1 and the second substrate SUB2. For example, the sealant S may include a thermosetting material or a photo-curable material. After the first substrate SUB1 and the second substrate SUB2 are bonded, the sealant S may be cured by using heat or laser.

As described above, the touch sensor TS disposed on the display panel DP may be directly formed on the second substrate SUB2 of the display panel DP without a separate substrate.

According to one embodiment, the touch sensor TS may be a mutual-capacitance touch sensor type sensing a change of capacitance between two touch electrodes including a transmitting electrode and a receiving electrode. In this case, as shown in FIG. 1, a first subset of the touch electrodes TE may be connected in the first direction to form a plurality of touch electrode rows parallel to each other. In addition, a second subset of the touch electrodes TE may be connected in the second direction intersecting the first direction to form a plurality of touch electrode columns parallel to each other. The touch electrode rows and the touch electrode columns may be connected to the pads PD through the respective ones of the touch lines TL. In addition, although not shown, the touch sensor TS according to an exemplary embodiment of the present disclosure may be a self-capacitance touch sensor type sensing a change of capacitance between a single touch electrode and a touching object (e.g., a human finger or a stylus).

The touch electrodes TE may be disposed to overlap the display region DA of the display panel DP to sense a touch input by a human finger or a stylus. In the display region DA, the touch input to the display device may be recognized through a touch electrode TE, and an image corresponding to the touch input may be displayed in the display region DA.

The touch electrodes TE may be formed of a transparent conductive material such as indium tin oxide (ITO), indium zinc oxide (IZO), or the like, or may be formed of an opaque conductive material such as molybdenum (Mo), silver (Ag), titanium (Ti), copper (Cu), aluminum (Al), or the like. In FIG. 1, the touch electrodes TE are shown as rhombus shapes, but the shape and arrangement of the touch electrodes TE are not limited thereto. In addition, at least a portion of the touch electrodes TE may be in a form of a mesh structure in which fine patterns intersect. In this case, an aperture ratio and transmittance of the display device may not be deteriorated by the touch electrodes TE due to their mesh structure having the fine patterns. In addition, the mesh structure of the touch electrodes TE may be advantageous to implement a bendable, foldable or rollable touch sensor.

The touch electrodes TE may be electrically connected to each pads PD through the respective ones of the touch lines TL.

According to one embodiment, the touch sensor TS may include a double routing type. In the double routing type, each touch electrode row or each touch electrode column is connected to two touch lines TL, and the touch sensitivity of the touch sensor TS may be improved. In the example shown in FIG. 1, each touch electrode column is connected to two touch lines TL, and each touch electrode row is connected to one touch line TL. However, the present disclosure is not limited thereto, and each touch electrode row may also be connected to two touch lines TL in another embodiment without deviating from the scope of the present disclosure. In yet another embodiment, the touch sensor TS may be a single routing type in which each touch electrode row or each touch electrode column is connected to one touch lines TL.

The touch lines TL and the pads PD are disposed in a region corresponding to the non-display region NDA of the display panel DP, and the region where the touch lines TL and the pads PD are disposed may be a non-sensing region of the touch sensor TS. The touch lines TL may be formed as a single layer or multiple layer, including an opaque conductive material such as molybdenum (Mo), silver (Ag), titanium (Ti), copper (Cu), aluminum (Al), or the like.

Some of the touch lines TL may include regions having different widths with each other. Referring to FIG. 2, the touch lines TL include a first region having a first width W1 and a second region having a second width W2 that is wider than the first width W1. The second region of the touch lines TL having the second width W2 may have a reduced line resistance due to its thin width. It is understood that a plurality of parameters such as a ratio of the first width W1 to the second width W2, the number of touch lines TL having the first width W1 and the second width W2, or the like may be easily changed in consideration of a size of the display panel DP, the area of the display region DA and the non-display region NDA, or the like.

According to one embodiment, the second region of the touch lines TL having the second width W2 may be disposed closer to an outer edge of the non-display region NDA than the first region of the touch lines TL having the first width W1.

The area occupied by the second region of the touch lines TL having the second width W2 will require a wider and larger area in the non-display region NDA compared to the area occupied by the first region of the touch lines TL having the first width W1 that is smaller than the second width W2. Therefore, the second region of the touch lines TL having the second width W2 may be disposed in the second region of the non-display region NDA having the second length L2 because the second region of the non-display region NDA is relatively wider and larger than the first region of the non-display area NDA having the first length L1 as shown in FIG. 1.

A gap between adjacent touch lines TL may be uniform. For example, as shown in FIG. 1, the gap d between adjacent touch lines TL may be uniform. In other embodiment, the gap between adjacent touch lines TL may not be constant. For example, as shown in FIG. 2, the touch lines TL adjacent to each other include a region spaced by the first gap d1 and a region spaced by the second gap d2. The region spaced by the first gap d1 may correspond to the first region of the touch lines TL having the first width W1, and the region spaced by the second gap d2 may correspond to the second region of the touch lines TL having the second width W2. In one embodiment, the second gap d2 is wider than the first gap d1. As described above, the second region of the touch lines TL that has the second width W2 is disposed in the second region of the non-display region NDA having the second length L2. Therefore, the adjacent touch lines TL may be relatively sufficiently separated in the second region of the non-display region NDA having the second length L2 by the second gap d2. The larger gap d2 between the adjacent touch lines TL may reduce or prevent signal interference therebetween.

Referring to FIG. 1, the plurality of pads PD may be connected to a printed circuit board PCB on which a touch driver T-IC is mounted. According to one embodiment, the printed circuit board PCB may be a flexible printed circuit board (FPCB).

The touch driver T-IC may receive a touch input signal from an external touch-sensing driver (not shown) and transmit the touch input signal to the touch electrodes TE, or may receive touch signals sensed by the touch electrodes TE and transmit the touch signals to the external touch-sensing driver.

Referring to FIGS. 3A, 3B, and 3C, an insulation layer IL is disposed on the touch electrodes TE and the touch lines TL to prevent oxygen and moisture from entering the touch electrodes TE and/or the touch lines TL from the outside. The insulation layer IL may include at least one of an organic insulation layer including an organic material and an inorganic insulation layer including an inorganic material. For example, the insulation layer IL may be formed of a single layer or a multiple layer and may include at least one organic insulation layer and planarizes an upper surface of the touch sensor TS. The insulation layer IL is formed to expose the pads PD so that the pads PD can be connected to the above-described printed circuit board PCB.

The window panel WP may be dispose on the insulation layer IL. The window panel WP may include an adhesive layer OCR, a black matrix BM, and a window W in addition to the polarizer POL.

According to one embodiment, the polarizer POL may be disposed on the insulation layer IL. The polarizer POL may be provided in a plate shape and be disposed on a front (or upper) surface of the touch sensor TS. For example, the polarizer POL may include a film made of Poly Vinyl Alcohol (PVA), but the present disclosure is not limited thereto. The polarizer POL may fully overlap the display region DA and be disposed to overlap at least a portion of the non-display region NDA around the display region DA. The polarizer POL may prevent reflections of external light incident on the display region DA while preventing a plurality of touch lines TL disposed in the non-display region NDA from being visible outside the display device.

Referring to FIG. 3A, an edge of the polarizer POL facing the pads PD is disposed to be spaced apart from the pads PD by a predetermined distance in the second direction. This prevents the polarizer POL from being damaged when the printed circuit board PCB disposed on the pad PD is pressed using a pressing tool.

According to one embodiment, the polarizer POL may fully overlap the second region of the touch lines TL having the second width W2. In this case, the edge of the polarizer POL may include a portion that extends toward an edge of the second substrate SUB2 to overlap the sealant S with the second substrate SUB2 being interposed therebetween.

The window W may be attached to the polarizer POL by using an adhesive layer OCR disposed therebetween. The adhesive layer OCR may be an optically clear resin, and the window W may be attached to the polarizer POL by using an optically clear adhesive (OCA).

The window W may be formed of a transparent insulation material made of glass, quartz, ceramic, plastic, or the like. For example, the window W may be formed of tempered glass or reinforced plastic with high impact resistance or scratch resistance.

According to one embodiment, the black matrix BM may be disposed on the window panel WP to overlap at least a portion of the non-display region NDA to prevent elements such as the touch lines TL and the pads PD disposed in the non-display region NDA of the display panel DP from being visible from the outside. The black matrix BM may be disposed between the window W and the display panel DP.

In one embodiment, the black matrix BM may overlap the non-display region NDA along an outline of the display region DA, such as the sealant S. The black matrix BM may be disposed to fully overlap the non-display region NDA or may be disposed to at least partially overlap the non-display region NDA. The black matrix BM may be disposed considering a viewing angle of the display device. For example, as shown in FIGS. 3A, 3B, and 3C, the black matrix BM may be disposed to overlap the sealant S and the pads PD.

For example, the black matrix BM may fully overlap the non-display region NDA when the display device is viewed substantially from the front, i.e., a viewing angle of the display device is small. In another example, as the viewing angle of the display device becomes larger, a portion of the display region DA may be obscured by the edge of the black matrix BM, and the edge of the black matrix BM and the display region DA may be sufficiently separated from each other.

As discussed above, the non-display region NDA of the display panel DP includes the second region having the second length L2 in which the first region of touch lines TL having the first width W1 and the second region of the touch lines TL having the second width W2 that is wider than the first width W1 are disposed. The edge of the polarizer POL may include a portion that extends toward an edge of the second substrate SUB2 to overlap at least a portion of the sealant S and the second region of the touch lines TL having the second width W2.

Hereinafter, referring to the accompanying drawings, the touch lines TL disposed in the non-display region according to an exemplary embodiment of the present disclosure will be described in detail.

Figure 4:
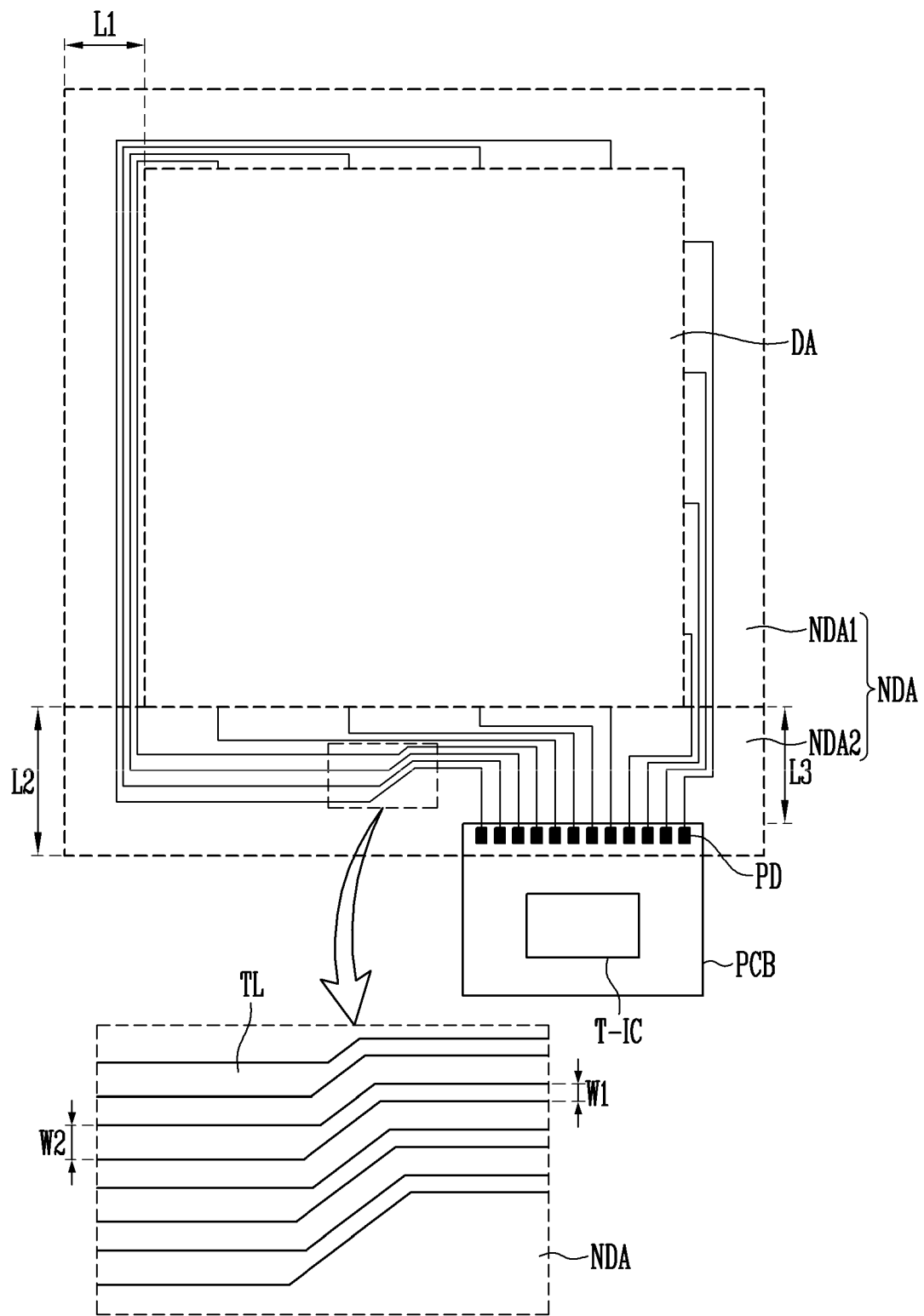
FIG. 4 illustrates an arrangement of touch lines of FIG. 1.

FIG. 4 illustrates an arrangement of touch lines of FIG. 1.

As shown in FIG. 4, the touch lines TL may be disposed in the non-display region NDA and connect the touch electrodes TE of FIG. 1 disposed in the display region DA to the pads PD.

The non-display region NDA includes a first non-display region NDA1 having the first length L1 measured from the edge of the display region DA to the edge of the non-display region NDA and a second non-display region NDA2 having the second length L2 that is longer than the first length L1. The pads PD are disposed in the second non-display region NDA2. Because the pads PD are disposed in the second non-display region NDA2, the second non-display region NDA2 may include a region having a third length L3 that is shorter than the second length L2.

As shown in FIG. 4, the touch lines TL disposed in the first non-display region NDA1 having the first length L1 and the region of the second non-display region NDA2 having the third length L3 are limited in their width. Therefore, in an exemplary embodiment of the present disclosure, the touch lines TL may have the second width W2 that is wider than the first width W1 in a region of the second non-display region NDA2 having the second length L2. In addition, in the second non-display region NDA2, the region of the touch lines TL having the second width W2 may be disposed closer to an outer edge of the non-display region NDA compared to the region of the touch lines having the first width W1.

Therefore, in the display device according to an exemplary embodiment of the present disclosure, a portion of the width of the touch lines TL in the second non-display region NDA2, in which the distance measured from the edge of the display region DA to the edge of the non-display region NDA is relatively long, may be formed wider without enlarging the area of the non-display region NDA. If the width of the touch lines TL is widened, the corresponding line resistance of the touch lines TL is reduced, and a delay of a touch signal transmitted through the touch lines TL may be reduced. Therefore, the touch performance of the touch sensor TS may be improved as the width of the touch lines TL is widened.

As discussed above, the polarizer (i.e., POL in FIG. 1) may extend in a region where the width of the touch lines TL is widened, and the shape of the polarizer POL will be described in detail referring to the accompanying drawings.

Figure 5:
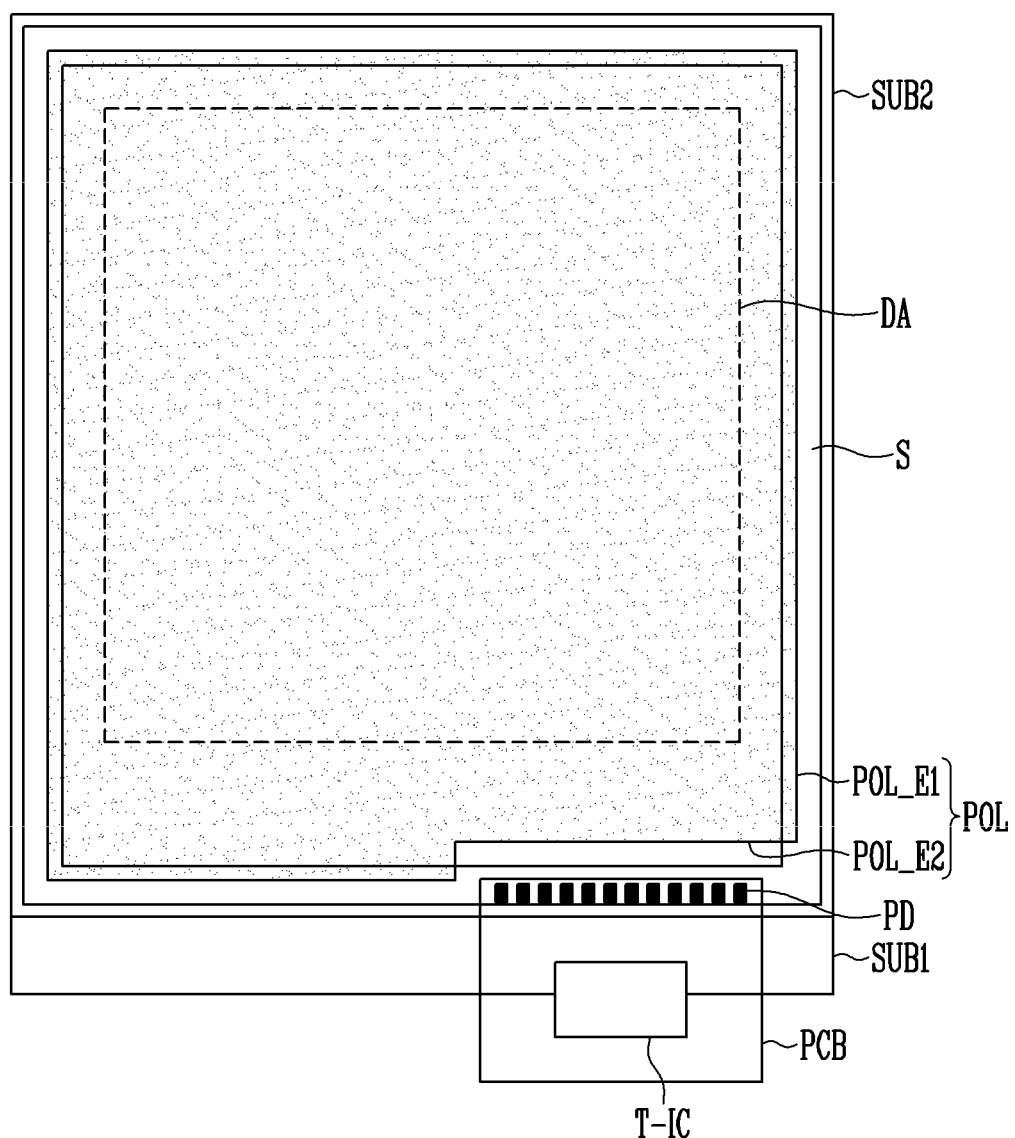
FIG. 5 is a drawing for explaining a relationship between a polarizer, a sealant, and pads of FIG. 1.

FIG. 5 is a drawing for explaining a relationship between the polarizer POL, the sealant S, and the pads PD of FIG. 1.

As shown in FIG. 5, the polarizer POL may fully overlap the display region DA and further overlap at least a portion of the non-display region NDA.

The edge of the polarizer POL may extend toward the edge of the second substrate SUB2 and may fully overlap the region of the touch lines TL having the second width W2 that is disposed in the non-display region NDA. In some regions of the non-display region NDA, the edge of the polarizer POL may overlap at least a portion of the sealant S.

More specifically, the edge of the polarizer POL includes the first edge POL_E1 overlapping at least a portion of the sealant S and the second edge POL_E2 not overlapping the sealant S. In one embodiment, the second edge POL_E2 is disposed closer to the display region DA than the first edge POL_E1.

The region of the touch lines TL having the second width W2 may be disposed between the first edge POL_E1 of the polarizer POL and the display region DA, and a plurality of pads PDs may be disposed between the second edge POL_E2 of the polarizer POL and the edge of the second substrate SUB2. The plurality of pads PD may be disposed to overlap the sealant S with the second substrate SUB2 being interposed therebetween.

The first edge POL_E1 of the edge of the polarizer POL that corresponds to the region except the exposed region of the pads PD may overlap at least a portion of the sealant S with the second substrate SUB2 being interposed therebetween.

Referring to FIGS. 1 through 5, the display device according to an exemplary embodiment of the present disclosure may include the touch line TL having the second width W2 in the second region of the non-display region NDA having the second length L2 that is measured from the edge of the display region DA to the edge of the non-display region NDA is relatively long. The edge of the polarizer POL may extend toward the edge of the second substrate SUB2 in the region where the touch line TL has the second width W2.

According to an exemplary embodiment of the present disclosure, the width of only a portion of the touch lines TL in the second non-display region NDA2 of the non-display region of the NDA may increase, wherein the second non-display region NDA2 has the second length L2 that is measured from the edge of the display region DA to the edge of the non-display region NDA is relatively long. Accordingly, a display device can have a widened width of a portion of the touch lines TL while maintaining a gap between adjacent touch lines TL, and the signal interference between the adjacent touch lines TL can be reduced or prevented by forming the gap d2 in the region of the touch lines TL having the second width W2 to be wider than the gap d1 in the region of the touch lines TL having the first width W1.

Furthermore, in a case where the touch sensor TS is a double routing type, the number of touch lines TL may increase. In the example shown in FIG. 1, eight touch lines TL are connected to four touch electrode columns. However, the present disclosure is not limited thereto, and any number of touch electrode rows and columns may be used without deviating from the scope of the present disclosure. Since the touch lines TL include a region having a relatively wide width, the resistance of the touch lines TL is reduced to prevent a delay of the touch signal, thereby improving the touch performance of the display device.

Hereinafter, a display device according to another exemplary embodiment of the present disclosure will be described with reference to the accompanying drawings.

Figure 6:
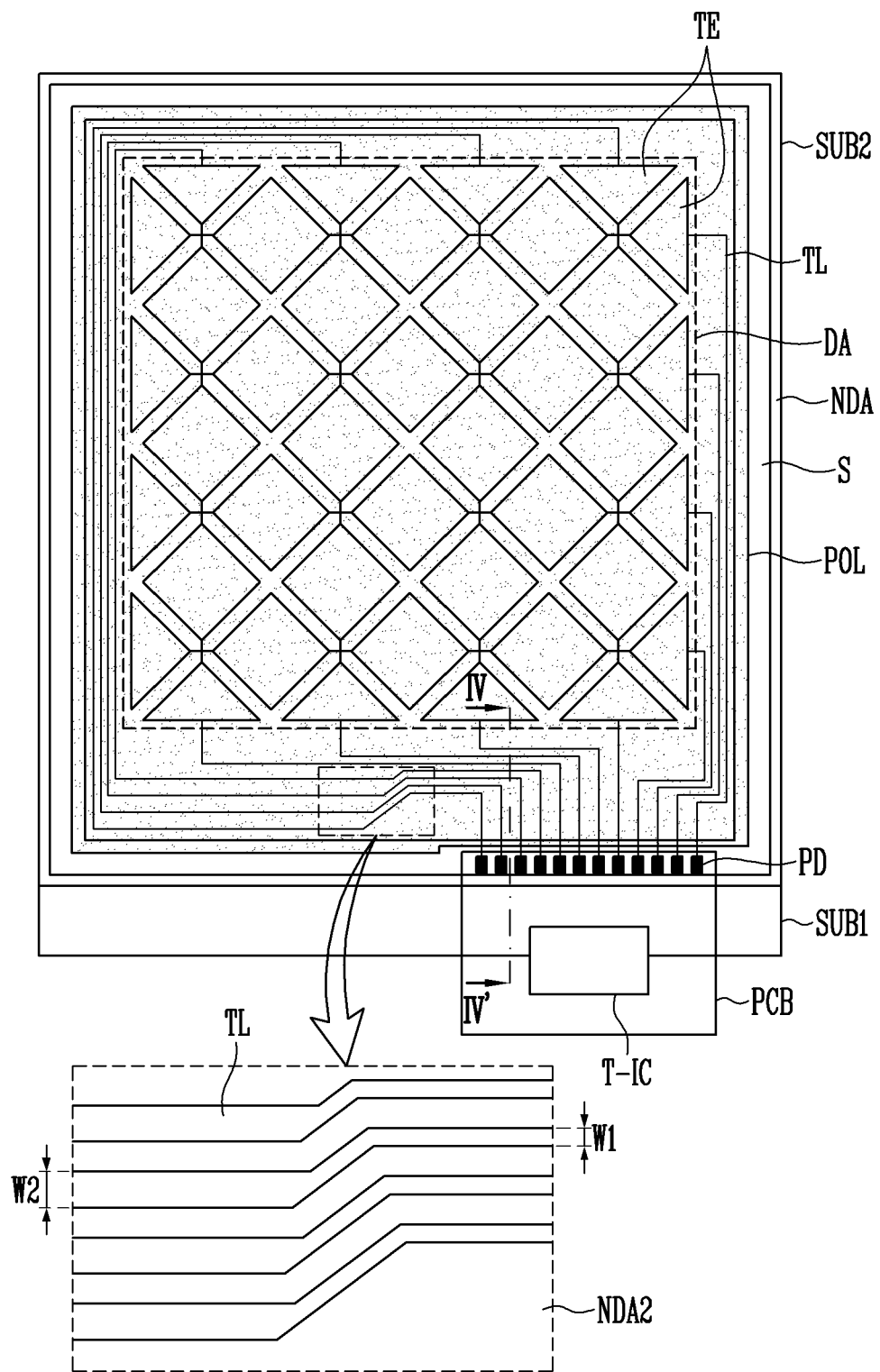
FIG. 6 is a plan view of a display device according to another exemplary embodiment of the present disclosure.
Figure 7A:
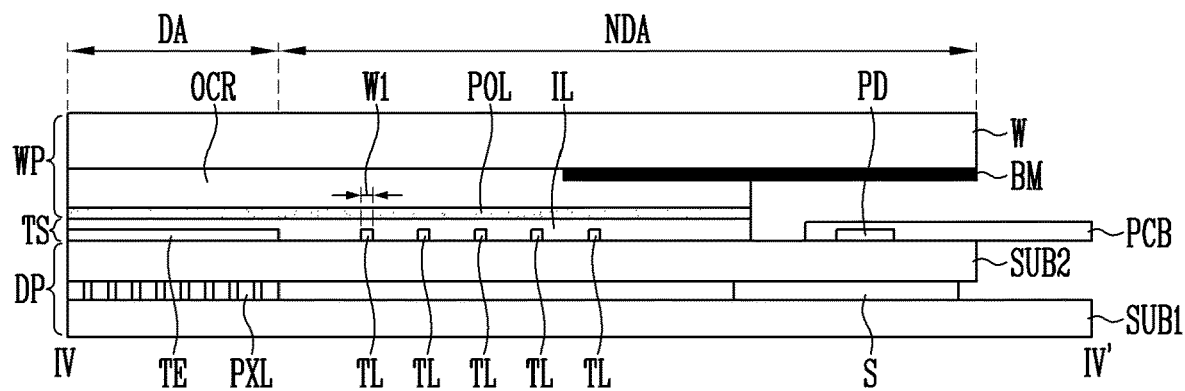
FIG. 7A is a cross-sectional view of FIG. 6 taken along a line IV-IV'.
Figure 7B:
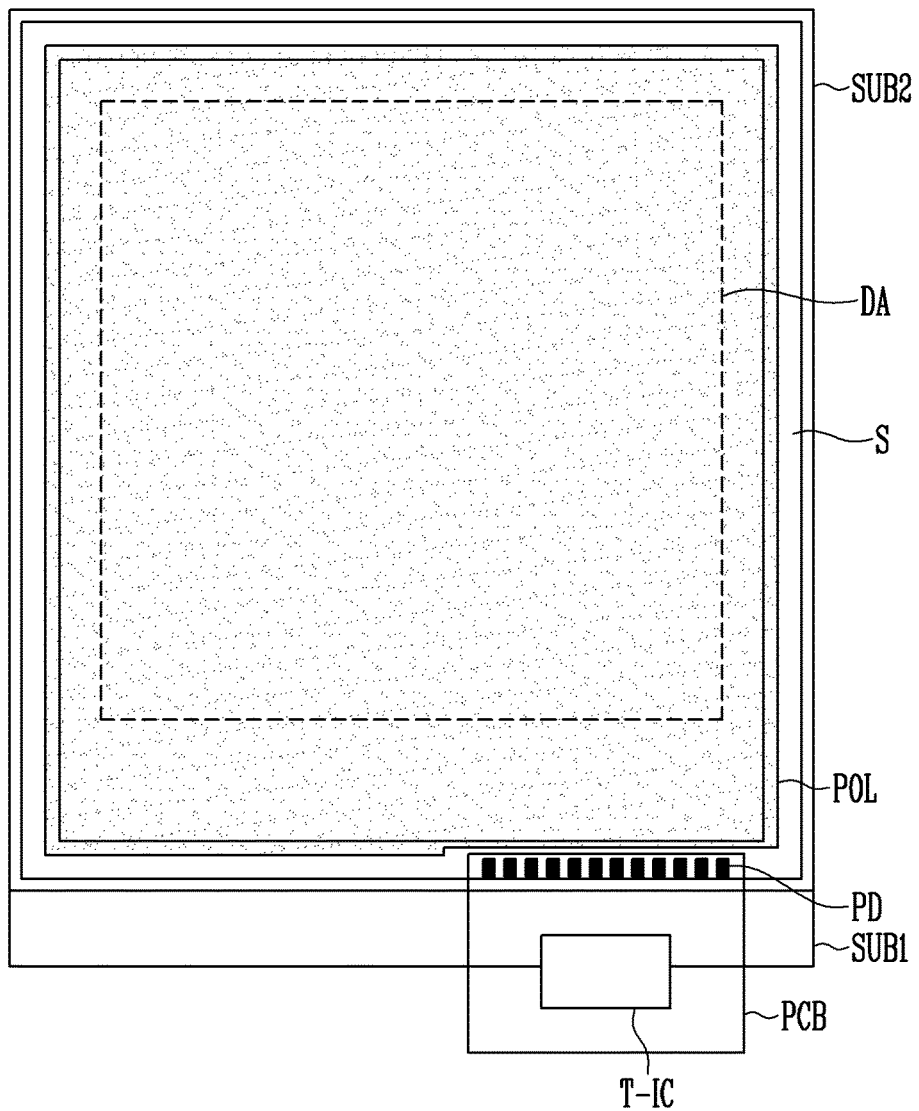
FIG. 7B is a drawing for illustrating a structure of a polarizer of FIG. 6.

FIG. 6 is a plan view of a display device according to another exemplary embodiment of the present disclosure. FIG. 7A is a cross-sectional view of FIG. 6 taken along a line IV-IV'. FIG. 7B is a drawing for illustrating a structure of the polarizer POL of FIG. 6.

A display device according to the exemplary embodiment shown in FIG. 6 is the same as the display device described with reference to FIGS. 1, 2, 3A, 3B, 3C, 4 and 5 except for the shape of the polarizer POL.

Specifically, as shown in FIGS. 6, 7A, and 7B, all edge of the polarizer POL overlaps at least a portion of the sealant S with the second substrate SUB2 being interposed therebetween.

Similar to the display device shown in FIGS. 1, 2, 3A, 3B, 3C, 4 and 5, some of the touch lines TL includes the first region having the first width W1 and the second region having the second width W2 that is wider than the first width W1. In this embodiment, however, the edge of the polarizer POL facing the plurality of pads PD overlaps at least a portion of the sealant S as shown in FIG. 7A. In comparison, the edge of the polarizer POL facing the plurality of pads PD does not overlap the sealant S in the embodiment shown in FIG. 3A.

That is, the edge of the polarizer POL facing the plurality of pads PD is extended to overlap at least a portion of the sealant S. In this case, the touch lines TL may be minimally exposed between the plurality of pads PD and the sealant S. Thus, the area of touch lines TL exposed to external oxygen or moisture may be minimized, and the reliability of the touch sensor TS may be improved.

While exemplary embodiments of the present disclosure are described with reference to the accompanying drawings, those with ordinary skill in the technical field of the present disclosure will understood that the present disclosure can be carried out in other forms without changing the inventive concept and/or essential features of the present disclosure. It is also understood that the exemplary embodiments should be considered in a descriptive sense only and not for purposes of limitation.

What is claimed is:

1. A display device comprising:
a display panel including a first substrate and a second substrate that are partitioned into a display region and a non-display region that is disposed outside the display region;
a touch sensor including a plurality of touch electrodes overlapping the display region and formed on the second substrate, a plurality of pads formed on the second substrate, and a plurality of touch lines connecting the plurality of pads and the plurality of touch electrodes; and
a polarizer disposed on the touch sensor,
wherein the non-display region includes a first non-display region disposed at one side of the display region and a second non-display region disposed at another side of the display region,
wherein the plurality of pads is disposed in the second non-display region,
wherein at least some of the plurality of touch lines include a first region having a first width, a second region having a second width that is wider than the first width, and a sloped region that connects the first region and the second region that extend parallel to each other,
wherein the first region and the second region extend in a first direction in the second non-display region,
wherein the first region is spaced apart from the plurality of pads and an extension of the first region that connects to the first region and extends in a second direction crossing the first direction overlaps the plurality of pads, and
wherein the second region is spaced apart from the plurality of pads in the second direction,
wherein the polarizer entirely overlaps the display region and overlaps at least a portion of the non-display region,
wherein an edge of the polarizer overlaps at least a portion of a sealant, wherein the second substrate is interposed between the polarizer and the sealant,
wherein the edge of the polarizer includes a first edge overlapping the portion of the sealant and a second edge not overlapping the sealant, and
wherein the second edge is disposed closer to the display region than the first edge.

2. The display device of claim 1, wherein
the second region of the at least some of the plurality of touch lines having the second width is closer to an edge of the non-display region than the first region of the at least some of the plurality of touch lines having the first width.

3. The display device of claim 1, wherein the first non-display region has a first length measured from a first edge of the display region to a first edge of the non-display region, wherein the second non-display region has a second length measured from a second edge of the display region to a second edge of the non-display region, and wherein the second length is longer than the first length.

4. The display device of claim 3, wherein
the second region of the at least some of the plurality of touch lines having the second width is disposed in the second non-display region.

5. The display device of claim 1, wherein a gap between touch lines of the plurality of touch lines adjacent to each other is non-uniform.

6. The display device of claim 5, wherein
adjacent ones of the at least some of the plurality of touch lines are spaced by a first gap in the first region, and the adjacent ones of the at least some of the plurality of touch lines are spaced by a second gap in the second region.

7. The display device of claim 6, wherein
the second gap is wider than the first gap.

8. The display device of claim 1, wherein
the second region of the at least some of the plurality of touch lines having the second width entirely overlaps the polarizer.

9. The display device of claim 1, wherein
the second region of the at least some of the plurality of touch lines having the second width is disposed between the display region and the first edge of the polarizer.

10. The display device of claim 1, wherein
the plurality of pads is disposed between the second edge of the polarizer and an edge of the second substrate.

11. The display device of claim 1, wherein the touch sensor is a double routing type.

12. The display device of claim 11, wherein
the plurality of touch electrodes include a plurality of touch electrode rows extending in the first direction and a plurality of touch electrode columns extending in the second direction, and
each of the plurality of the touch electrode rows and/or the touch electrode columns is connected to at least two touch lines of the plurality of touch lines.

13. A display device comprising:
a display panel including a substrate that is partitioned into a display region and a non-display region that is disposed outside the display region;
a touch sensor including a plurality of touch electrodes overlapping the display region and formed on the substrate, a plurality of pads and formed on the substrate, and a plurality of touch lines connecting the plurality of pads and the plurality of touch electrodes; and
a polarizer disposed on the touch sensor,
wherein the non-display region includes a first non-display region disposed at one side of the display region and a second non-display region disposed at another side of the display region,
wherein the plurality of pads is disposed in the second non-display region, wherein at least some of the plurality of touch lines include a first region having a first width, a second region having a second width that is wider than the first width, and a sloped region that connects the first region and the second region that extend parallel to each other, wherein the first region and the second region extend in a first direction in the second non-display region, wherein the first region is spaced apart from the plurality of pads and an extension of the first region that connects to the first region and extends in a second direction crossing the first direction overlaps the plurality of pads, wherein the second region is spaced apart from the plurality of pads in the second direction, wherein the polarizer entirely overlaps the display region and overlaps at least a portion of the non-display region, wherein an edge of the polarizer overlaps at least a portion of a sealant, wherein the second substrate is interposed between the polarizer and the sealant, wherein the edge of the polarizer includes a first edge overlapping the portion of the sealant and a second edge not overlapping the sealant, and wherein the second edge is disposed closer to the display region than the first edge.

14. The display device of claim 1, wherein the second region of the at least some of the plurality of touch lines having the second width entirely overlaps the polarizer.

15. The display device of claim 13, wherein adjacent ones of the at least some of the plurality of touch lines are spaced by a first gap in the first region, and the adjacent ones of the at least some of the plurality of touch lines are spaced by a second gap in the second region.

16. The display device of claim 15, wherein the second gap is wider than the first gap.

* * * * *